US012193373B1

(12) United States Patent
    Lewis, III

(10) Patent No.: US 12,193,373 B1
(45) Date of Patent: Jan. 14, 2025

(54) APPARATUS AND METHOD FOR TREATING A GROWTH MEDIUM VIA AN ELECTRICAL DISCHARGE

(71) Applicant: Nox Box Technologies LLC, Ormond Beach, FL (US)

(72) Inventor: Joseph E. Lewis, III, Ormond Beach, FL (US)

( * ) Notice: Subject to any disclaimer, the term of this patent is extended or adjusted under 35 U.S.C. 154(b) by 0 days.

(21) Appl. No.: 18/222,027

(22) Filed: Jul. 14, 2023

(51) Int. Cl.
    *A01G 7/04* (2006.01)
    *A01C 23/00* (2006.01)
    *A01G 27/02* (2006.01)

(52) U.S. Cl.
    CPC .............. *A01G 7/04* (2013.01); *A01C 23/00* (2013.01); *A01G 27/02* (2013.01)

(58) Field of Classification Search
    CPC . A01C 23/00; A01G 7/04; A01G 7/00; A01G 27/02; A01G 27/00
    See application file for complete search history.

(56) References Cited

U.S. PATENT DOCUMENTS

| 6,911,225 B2 | 6/2005 | Ruan | |
|---|---|---|---|
| 11,168,007 B2 | 11/2021 | Lewis | |
| 2002/0189446 A1* | 12/2002 | Rabovitser | B01D 53/22 95/52 |
| 2014/0322096 A1* | 10/2014 | Pelfrey | A61L 2/14 422/291 |

FOREIGN PATENT DOCUMENTS

| RU | 2764619 C1 | 1/2022 |
|---|---|---|
| WO | 2012/094743 A1 | 7/2012 |

* cited by examiner

*Primary Examiner* — Christopher J. Novosad
(74) *Attorney, Agent, or Firm* — Lori Sandman, Esq.

(57) ABSTRACT

An apparatus for treating a growth medium via an electrical discharge, the apparatus includes a treatment chamber configured to contain a growth medium, a reservoir configured to contain a fluid, a plasma reactor includes at least a pair of electrodes containing a first electrode and a second electrode configured to produce an electrical discharge as a function of the fluid, and a reaction region disposed between the first electrode and the second electrode configured to enable an interaction between the electrical discharge and the growth medium, an ignition unit electrically connected to at least an electrode, wherein the ignition unit is configured to supply an electrical voltage to the at least an electrode, an injector in fluidic connection with the reservoir configured to feed the fluid through the reaction region, and an pressure regulator configured to transfer at least the fluid to the injector.

20 Claims, 7 Drawing Sheets

APPARATUS AND METHOD FOR TREATING A GROWTH MEDIUM VIA AN ELECTRICAL DISCHARGE

FIELD OF THE INVENTION

The present invention generally relates to the field of Non-thermal Plasma (NTP) technology. In particular, the present invention is directed to an apparatus and method for treating a growth medium via an electrical discharge.

BACKGROUND

Plants regularly undergo a multitude of stresses such as, without limitation, scarcity of water, waterlogging, toxicity, high salinity, extreme temperatures, and the like. These stresses result in less yield of crops. To enhance seed germination and growth under the changing environment, techniques such as chemical, physical, and biological treatment are developing. However, most existing treatments may result in the change of seed morphology, gene expression, protein level. Crops grown with such treatment may potentially be toxic to humans and/or the environment.

SUMMARY OF THE DISCLOSURE

In an aspect, an apparatus for treating a growth medium via an electrical discharge is described. The apparatus includes a treatment chamber configured to contain a growth medium, at least a reservoir configured to contain at least a fluid, a plasma reactor, wherein the plasma reactor includes at least a pair of electrodes containing a first electrode and a second electrode, wherein the at least a pair of electrodes is configured to produce an electrical discharge as a function of the at least a fluid, and a reaction region disposed between the first electrode and the second electrode, wherein the reaction region is configured to enable an interaction between the electrical discharge and a growth medium, an ignition unit electrically connected to at least an electrode of the at least a pair of electrodes, wherein the ignition unit is configured to supply an electrical voltage to the at least an electrode, an injector in fluidic connection with the at least a reservoir, wherein the injector is configured to feed at least a fluid through the reaction region, and an pressure regulator configured to transfer at least a fluid to the injector.

In another aspect, a method for treating a growth medium via an electrical discharge is described. The method includes transferring, by an atmospheric pressure system, at least a fluid contained in at least a reservoir to an injector, feeding, by the injector in fluidic connection with the at least a reservoir, the at least a fluid through a reaction region of a plasma reactor, wherein the plasma reactor includes at least a pair of electrodes containing a first electrode and a second electrode, and the reaction region is disposed between the first electrode and the second electrode, supplying, by an ignition unit electrically connected to at least an electrode of the at least a pair of electrodes, an electrical voltage to the at least an electrode, producing, by the at least a pair of electrodes, an electrical discharge as a function of the at least a fluid, and enabling, by the reaction region, an interaction between the electrical discharge and a growth medium contained in a treatment chamber.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for treating a growth medium via an electrical discharge. In an embodiment, the apparatus includes a plasma reactor, wherein the plasma reactor includes at least a pair of electrodes containing a first electrode and a second electrode, configured to produce an electrical discharge. The plasma reactor further includes a reaction region disposed between the first electrode and the second electrode, wherein the reaction region is configured to enable an interaction between the electrical discharge and a growth medium contained in a treatment chamber.

Aspects of the present disclosure can be used to generate reactive oxygen and nitrogen species (RONS) and change solution properties pH, electrical conductivity, and oxidation-reduction potential. Aspects of the present disclosure can also be used to affect the rate of the growth medium (e.g., seed) germination, enhancement in plant growth, as well as an increase in agricultural yields. This is so, at least in part, because the apparatus is configured to expose growth medium to a non-thermal plasma (NTP) using a high energy ignition system. The apparatus may generate a high voltage NTP using air, water, and an electrical load without any harmful emission.

Aspects of the present disclosure allow for growth medium treatment under low-temperature without damaging growth medium. Exemplary embodiments illustrating aspects of the present disclosure are described below in the context of several specific examples.

Figure 1:
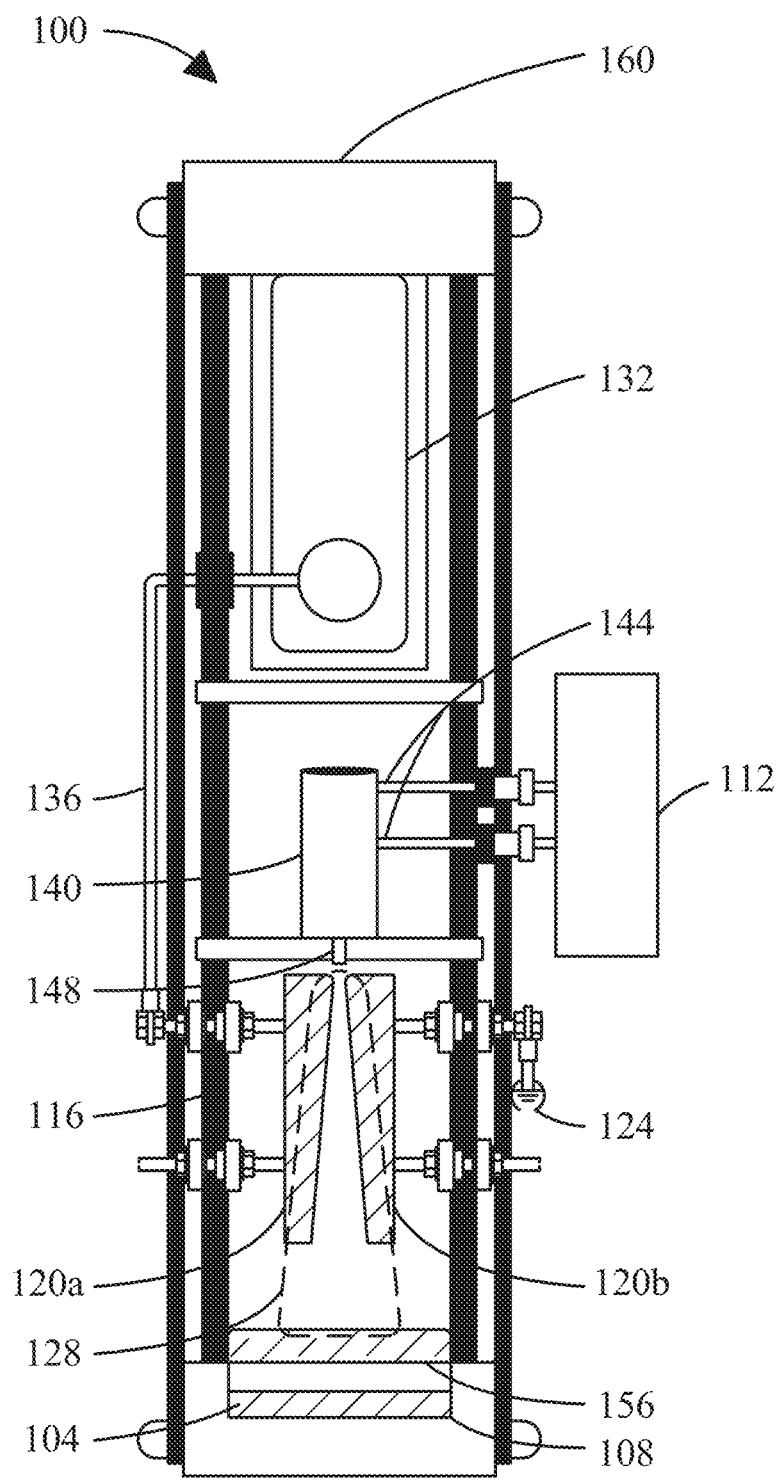
FIG. 1 is an exemplary embodiment of an apparatus for treating a growth medium via an electrical discharge.

Now referring to FIG. 1, an exemplary embodiment of an apparatus 100 for treating a growth medium 104 via an electrical discharge is illustrated. As used in this disclosure, a "growth medium" is a substance or material that provides essential nutrients and environmental conditions for the growth and proliferation of microorganisms, cells, tissues. In an embodiment, one or more seeds may be placed in growth medium 104. "Seeds," for the purpose of this disclosure, are a mature, fertilized ovule of a flowering plant (i.e., angiosperms) that contains an embryonic plant within a protective outer covering, serve as the primary means of reproduction for many plant species, enabling them to disperse and establish new plants. In some embodiments, seeds may include, without limitation, cereal seeds (e.g., wheat, rice, corn, barley, oats, millets, and the like), legume seeds (e.g., soybeans, peas, beans, lentils, chickpeas, peanuts, and the like), oilseeds (e.g., sunflower, rapeseed, flaxseed, sesame, safflower, and the like), vegetable seeds (e.g., tomatoes, peppers, cucumbers, eggplants, lettuce, spinach, and the like), and fruit seeds (e.g., watermelon, muskmelon, apple, citrus, and the like). In such an embodiment, growth medium 104 may include a nutrient-rich environment that provides the essential conditions for germination and growth of the seeds. In some cases, growth medium may provide environmental factors such as, without limitation, temperature, pH level, oxygen, and the like required for the seed to germinate and develop into a healthy plant. In a non-limiting example, growth medium 104 may include soil, wherein the soil may include a complex mixture of mineral particles, organic matter, water, air, living organisms, and the like. In another non-limiting example, growth medium 104 may include soilless mix or a specially formulated medium designed for seed germination and plant growth.

With continued reference to FIG. 1, apparatus 100 includes a treatment chamber 108 configured to contain growth medium 104. As used in this disclosure, a "treatment chamber" is a controlled space designed to hold a specific material, substance, object, and subject it to a particular treatment. In an embodiment, treatment chamber 108 may be constructed as an open system; for instance, and without limitation, treatment chamber 108 may include an open-top container. In another embodiments, treatment chamber 108 may be constructed as a closed system; for instance, and without limitation, treatment chamber 108 may be an enclosed container with an airtight seal. In some embodiments, treatment chamber 108 may be designed to provide easy access to the growth medium 104 being treated. In a non-limiting example, treatment chamber 108 may include removable or hinged doors or ports for loading and/or unloading growth medium 104. In another non-limiting example, treatment chamber 108 may include one or more window with/without cover for visual inspection or sampling during the treatment process.

With continued reference to FIG. 1, apparatus 100 includes at least a reservoir 112. As used in this disclosure, a "reservoir" is a container or storage chamber designed to hold at least a fluid used in the treatment process. In a non-limiting example, reservoir 112 is configured to contain at least a fluid. A "fluid" as used in this disclosure is defined as a gas or fluid. Reservoir may provide a consistent and controlled supply of at least a fluid for the treatment of growth medium 104 as described in further detail below. In an embodiment, fluid may include a substance that enables the production of electrical discharge. In some cases, at least a fluid may include liquid; for instance, and without limitation, at least a fluid may include water, organic solvents, electrolyte solutions, and the like. In other cases, at least a fluid may include one or more gases; for instance, and without limitation, at least a fluid may include inert gases (e.g., nitrogen, argon, helium, neon, and the like), oxygen, carbon dioxide, air, reactive gases (e.g., hydrogen, ammonia, sulfur hexafluoride, and the like), and the like. Additionally, or alternatively, apparatus 100 may include a plurality of reservoirs. In an embodiment, at least a reservoir 112 may include a first reservoir configured to contain a first fluid and a second reservoir configured to contain a second fluid, wherein the first fluid may include at least a gas and the second fluid may include at least a liquid.

With continued reference to FIG. 1, at least a reservoir 112 may be constructed from materials that are compatible with at least a fluid being stored. For example, and without limitation, at least a reservoir 112 may be made from material such as corrosion-resistant metals, plastics, and/or glass. In some cases, at least a reservoir 112 may be appropriately sized to provide an adequate supply of fluid throughout the treatment process without frequent refilling or interruptions. In an embodiment, fluid may be supplied by a pressurized hose or tube. At least a reservoir 112 may include at least an inlet, at least an outlet, or both. In a non-limiting example, at least an inlet may be used for filling at least a reservoir 112 with at least a fluid and at least an outlet may be connected to an injector or other fluid delivery component of apparatus 100 such as a pressure regulator as described in further detail below. At least a fluid may be input through the at least an inlet into at least a reservoir 112 and/or output through the at least an outlet to injector. In the case of apparatus 100 having a plurality of reservoirs, each reservoir of plurality of reservoirs may include at least an inlet and at least an outlet. In a non-limiting example, first reservoir configured to contain first fluid may include a first inlet and a first outlet, second reservoir configured to contain second fluid may include a second inlet and a second outlet, wherein the first inlet/first outlet may never intersect with second inlet/second outlet. In such an embodiment, first fluid and second fluid may not contact each other before output through first outlet/second outlet.

With continued reference to FIG. 1, apparatus 100 includes a plasma reactor 116. As used in this disclosure, a "plasma reactor" is a device configured to generate, sustain, and/or control plasma. "Plasma," for the purpose of this disclosure, refers to the fourth state of matter, in addition to solid, liquid, and gas. Plasma may include a partially ionized gas consisting of a mixture of ions, electrons, and/or neutral particles (i.e., atoms and molecules). In an embodiment, plasma may be formed when at least a fluid subject to high-energy source, such as, without limitation, heat, radiation, electric filed, and the like, causing the atoms or molecules in at least a fluid to become ionized by losing or gaining electrons. At least a fluid may be inputted into plasma reactor 116 using injector as described below in this disclosure. In some cases, plasma may include non-thermal plasma (NTP), wherein the non-thermal plasma is a type of plasma in which the electron temperature is significantly higher than the temperature of the heavier ions and neutral particles. In this case, while the electrons in plasma have high kinetic energy, the overall temperature of at least a fluid may remain relatively low (e.g., often near room temperature of 20-22 C/68-72 F). Additionally, or alternatively, the energy distribution among particles within non-thermal plasma may not be in thermal equilibrium due to the electrons, being much lighter than ions and neutral particles, may gain energy more rapidly when subjected to an electric or magnetic field, leading to a higher electron temperature. On the other hand, heavier ions and neutral particles may move more slowly and remain cooler, resulting in low temperature of at least a fluid.

With continued reference to FIG. 1, plasma reactor 116 includes at least a pair of electrodes 120a-b, wherein the at least a pair of electrodes includes a first electrode 120a and a second electrode 120b. As used in this disclosure, an "electrode" is a conductor that is used to make electrical contact with a conductive medium and/or a medium that can become conductive given a sufficient voltage differential, such as at least a fluid as described above. At least a pair of electrodes 120a-b is configured to produce an electrical discharge as a function of at least a fluid. As used in this disclosure, an "electrical discharge" refers to a phenomenon where an electric current flows between two or more conductive surfaces (i.e., at least a pair of electrodes 120a-b) through at least a fluid, causing ionization and the subsequent release of energy in the form of light, heat, or sound. In a non-limiting example, at least a pair of electrodes 120a-b may receive a voltage, supplied by an ignition unit as described in further detail below, wherein the voltage may be applied across the surface of at least a pair of electrodes 120a-b, creating an electric field between first electrode 120a and second electrode 120b. Such electric field may accelerate free electrons and other charged particles in at least a fluid, initiating a cascade of ionization event, thereby resulting in a formation of a conductive channel of charged particles (i.e., plasma) such as ions and electrons that allow electric current to flow between first electrode 120a and second electrode 120b.

With continued reference to FIG. 1, each electrode of at least a pair of electrodes 120a-b may be constructed from a metal or a metal alloy such as copper that has certain electrical conductivity and capability to withstanding high temperatures and chemical reactions. In an embodiment, at least a pair of electrodes 120a-b may include at least a cathode and at least an anode. A "cathode," for the purpose of this disclosure, is an electrode that is negatively charged in an electrical circuit, while an "anode," for the purpose of this disclosure, is an electrode that is positively charged in the electrical circuit. In some cases, at least a cathode may be an electrode where reduction occurs (i.e., meaning that it gains electrons) and at least an anode may be an electrode where oxidation occurs (i.e., meaning that it loses electrons). In a non-limiting example, first electrode 120a may include an anode electrically connected to ignition unit as described above and second electrode 120b may include cathode electrically connected to a ground 124. As used in this disclosure, a "ground" is a common reference point or a conductive path that provides a baseline for measuring voltages, a return path for electric currents, and a means for safely dissipating excess electrical energy. Ground 124 may be connected to an earth's conductive surface or otherwise directly or through a grounding electrode conductor. Such connection may establish a reference voltage level (i.e., zero volts), against which other voltages within apparatus 100 may be measured. Additionally, or alternatively, ground 124 may provide a pathway for excess electrical energy to safely dissipate into the earth, reducing the risk of electrical shock, fires, or equipment damage of apparatus 100.

With continued reference to FIG. 1, plasma reactor includes a reaction region 128 disposed between first electrode 120a and second electrode 120b, wherein the reaction region 128 is configured to enable an interaction between electrical discharge (i.e., plasma) and growth medium 104. As used in this disclosure, a "reaction region" is a designated area or space within plasma reactor 116 where specific chemical or physical reactions take place. In some embodiments, generating plasma in reaction region may include generating reactive oxygen species (ROS) and reactive nitrogen species (RNS), wherein both species are highly reactive molecules primarily formed through an interaction of molecular oxygen (O2) and molecular nitrogen (N2) with high-energy species, such as free radicals, ions, and/or electrons generated through electrical discharge as described above. In some cases ROS may include, without limitation, superoxide (O2·-), hydroxyl radical (·OH), hydrogen peroxide (H2O2). Plasma may collide with O2 molecules, causing dissociation, ionization, or excitation, which subsequently leads to the formation of ROS through further reactions. In some cases, RNS may include, without limitation, nitric oxide (NO), nitrogen dioxide (·NO2), peroxynitrite (ONOO—), and the like. Plasma may collide with N2 molecules or other nitrogen-containing molecules, causing dissociation, ionization, or excitation, which subsequently leads to the formation of RNS through further reactions.

Still referring to FIG. 1, ROS and RNS may drive various chemical and physical reactions within reaction region 128 of plasma reactor 116 during the treatment process. In an embodiment, ROS and RNS may readily participate in oxidation and reduction reactions; for instance, and without limitation, ROS and RNS may oxidize organic compounds, reducing stability of the organic compounds, and leading to their degradation or modification. In another embodiment, ROS and RNS may effectively inactivate or kill microorganisms such as bacteria, viruses, fungi, and the like; for instance, and without limitation, ROS and RNS may damage microorganisms' cellular structures and disrupting their metabolic functions by attacking cell wall, cell membrane, proteins, nucleic acids, and the like. In a further embodiment, ROS and RNS may modulate cellular processes such as cell signaling, gene expression, immune response and the like in both prokaryotic and eukaryotic cells; for instance, and without limitation, in low concentrations, ROS and RNS may act as signaling molecules that regulate cellular functions, while at higher concentrations, they may induce cellular stress, damage, or apoptosis. In other embodiments, ROS and RNS may also react with other molecules or species to generate secondary reactive species.

In a non-limiting example, and continuing to refer to FIG. 1, reaction region 128 may include a space between first electrode 120a and second electrode 120b where the electrical charge takes place and plasma is generated as a function of at least a fluid. In an embodiment, reaction region 128 may include a gap between at least a pair of electrodes 120a-b, wherein first electrode 120a may be parallel to second electrode 120b (i.e., in a corona discharge). In another embodiment, reaction region 128 may include a cylindrical space within a coaxial electrode arrangement. In a non-limiting example, at least a pair of electrodes 120a-b may be arranged in a diverging configuration (i.e., in a gliding arc discharge). In yet another embodiment, the electrodes may be in a singular tapered designed having a wide portion and a narrow position, in this configuration the electrodes may be mounted in the center of a round metal cylinder and both gas and water may be introduced in a tangential method in order to elongate the arc or plasma discharge. First electrode 120a may be configured to diverge from second electrode 120b in diverging configuration; for instance, and without limitation, first electrode 120a and second electrode 120b may be slightly tilted. At least a pair of electrodes 120a-b may include an air gap in between first electrode 120a and second electrode 120b, wherein the air gap may be narrow on one end and gradually widen towards another end. For example, and without limitation, first electrode 120a may be closer together at one end and further apart at other end. In some cases, each electrode of at least a pair of electrodes 120a-b may include various shapes, such as, without limitation, linear, curved, spiral, and the like. In some cases, each electrode of at least a pair of electrodes 120a-b may be placed symmetrically on both sides of plasma reactor 116 along the fluid output axis of fluid outlet of injector as described below. The distance between first electrode 120a and second electrode 120b may be adjusted to control the intensity of electrical discharge.

Further referring to FIG. 1, in some embodiments, reaction region 128 may include a plurality of points of arc between first electrode 120a and second electrode 120b. As used in this disclosure, a "point of arc" refers to a flow of electrons between first electrode 120a and second electrode 120b. In some cases, point of arc may mark a starting point of electrical discharge. In some cases, position of point of arc may be influenced by various factors such as geometry and material of at least a pair of electrodes 120a-b, distance between first electrode 120a and second electrode 120b within at least a pair of electrodes 120a-b, received voltage, properties of at least a fluid, and the like. In a non-limiting example, point of arc may include a region where the electrical current "jumps" or "arcs" from first electrode 120a to electrode 120b. A first point of arc may be formed at the narrowest gap between first electrode 120a and second electrode 120b. First point of arc may include electrical field that is most intense. As plasma is generated, by plasma reactor 116 through electrical discharge, first point of arc may move along the surface of at least a pair of electrodes 120a-b due to the influence of the electric field and the flow of at least a fluid. Such movement may introduce the rest of plurality of points of arcs along the surface of at least a pair of electrodes 120a-b and ensure a continuous, non-equilibrium plasma that enhances the generation of ROS and/or RNS described above. Plasma reactor 116 and elements thereof will be described in further detail below with reference to FIG. 2.

With continued reference to FIG. 1, apparatus 100 includes an ignition unit 132 electrically connected to at least an electrode of at least a pair of electrodes 120a-b. As used in this disclosure, an "ignition unit" is an electrical component responsible for supplying an initial electrical voltage necessary to initiate electrical discharge between electrodes. In a non-limiting example, ignition unit is configured to supply an electrical voltage to at least an electrode. At least an electrode may include first electrode 120a (i.e., anode), Ignition unit 132 may include a power source. As used in this disclosure, a "power source" is any system, device, or means that provides power such as, without limitation, electric power to a device. Power source may provide electrical power to ignition unit 132 and/or other devices/components within apparatus 100 described in this disclosure, such as, without limitation, plasma reactor 116, injector, any computing device and/or the like. In a non-limiting example, apparatus 100 may be electrically connected to a power source. In some embodiments, power source may be externally electrically connected to apparatus 100. In such an embodiment, power source may include an external power source such as, without limitation, a wall outlet. In some cases, transmitting electric power may include using one or more continuous conductor 136. A "continuous conductor," as described herein, is an electrical conductor, without any interruption, made from electrically conducting material that is capable of carrying electrical current over a distance. Electrically conductive material may include any material that is conductive to electrical current and may include, as a nonlimiting example, various metals such as copper, steel, or aluminum, carbon conducting materials, or any other suitable conductive material.

With continued reference to FIG. 1, in some embodiments, ignition unit 132 may be configured to convert a lower input voltage (e.g., 110V/220V for AC voltages or 12V/24V for DC voltages) from power source into a higher output voltage, thereby providing necessary electrical energy to drive plasma reactor 116. In a non-limiting example, ignition unit 132 may include an ignition transformer. As used in this disclosure, an "ignition transformer" is an electrical transformer designed to generate a high voltage output which is used to initiate electrical discharge as described above, wherein the electrical transformer is a passive electrical device that transfers electrical energy from one circuit to another through the process of electromagnetic induction. In some cases, electrical transformer may be used to increase or decrease the voltage levels of alternating current (AC) electrical signal while maintaining the same frequency. In a non-limiting example, ignition transformer may be configured to step up the input voltage from a lower level (from power source) to a higher voltage level required by plasma reactor 116 to create an electrical arc (i.e., point of arc). In some embodiments, ignition transformer may include two sets of windings, wherein the two sets of windings may include a primary winding and a secondary winding. Two sets of windings may be wound around a magnetic core. In some cases, primary winding may be connected to lower voltage input, while secondary winding may generate high voltage output. In a non-limiting example, ignition unit 132 may include an ignition transformer configured to convert electrical power received from power source into a high-voltage discharge of a voltage range of 6 kV to 30 k. In another embodiment, the voltage range may be 3 kV to 18 k.

With continued reference to FIG. 1, in some embodiments, ignition unit 132 may be capable of converting AC voltage, which oscillates periodically between positive and negative values, into direct current (DC), which has a constant polarity (positive or negative) and does not change over time, for connected electrodes to produce a controlled and/or stable electrical discharge to generate and/or maintain the plasma. In some cases, apparatus 100 may need to convert AC to DC power supply to perform a pulsed operation. During the pulse plasma operation, plasma reactor 116 may operate in a pulsed mode, where the plasma may be generated and sustained for short periods followed by a period of no electrical discharge. DC power supply may be easily controlled and switched on and off as required, thereby making it suitable for pulsed plasma operation. In some cases, apparatus 100 may convert AC to DC power supply to reduce electrode wear and contamination; for instance, and without limitation, in. AC-powered plasma reactor 116, the constantly changing polarity of electrodes may lead to accelerated electrode wear and the release of electrode material into the generated plasma. In an embodiment, apparatus 100 may also convert AC to AC. For example, AC to AC converters may be used for converting the AC waveforms with one particular frequency and magnitude to AC waveform with another frequency at another magnitude. For example, an AC voltage controller may be a thyristor-based device which converts fixed alternating voltage directly to variable alternating voltage without a change in frequency. AC voltage controller may be a phase-controlled device and hence no force commutation circuitry may be required and natural or line commutation may be used. By using a DC power supply, the electrodes may maintain a constant polarity, reducing wear and contamination and increasing lifetime of the electrodes. In a non-limiting example, ignition unit 132 may include a rectifier. As used in this disclosure, a "rectifier" is an electrical device or circuit that converts AC to DC. Rectifier may be built using one or more diodes, wherein the diodes are semiconductor devices that allow electrical current to flow in only one direction and have a low resistance to electrical current flow in the forward direction (when the voltage is positive) and a high resistance to electrical current flow in the reverse direction (when the voltage is negative). In some cases, a rectifier may include, without limitation, half-wave rectifier, full-wave rectifier, and the like.

With continued reference to FIG. 1, in some embodiments, ignition unit 132 may include a power regulator (i.e., filter). As described in this disclosure, a "power regulator" is an electric device in power source 108 that performs electrical power regulation or redistribution, wherein "power regulation" or "power redistribution," as described herein, refers to a process that keeps voltage of power source below its maximum value during operation, non-operation, or charging. In a non-limiting example, power regulator may be used to remove or attenuate unwanted frequencies, noise, or voltage fluctuations from the output voltage or current. Power regulator may include, without limitation, passive filter, active filter, EMI/RFI filter, voltage regulator, and the like. Additionally, or alternatively, ignition unit 132 may include a balancer. As described herein, a "balancer" is an electric that performs power balancing, wherein "power balancing," for the purpose of this disclosure, refers to a process that balances electric energy from one or more first power sources (e.g., strong batteries) to one or more second power sources (e.g., weaker batteries). Persons skilled in the art, upon reviewing the entirety of this disclosure, will be aware of various devices/components that may be used within ignition unit 132 of apparatus 100.

With continued reference to FIG. 1, apparatus 100 includes an injector 140 in fluidic connection with at least a reservoir 112. As used in this disclosure, an "injector" is a component designed to introduce at least a fluid into plasma reactor 116, specifically, reaction region 128 of plasma reactor 116. In a non-limiting example, injector 140 is configured to feed at least a fluid through reaction region. At least a fluid may then be used by the plasma reactor 116 to generate plasma. "Fluidic connection," for the purpose of this disclosure, refers to a pathway or link that enables the transfer of at least a fluid. In a non-limiting example, fluidic connection between injector 140 and at least a reservoir 112 may be established using various components such as, without limitation, tubes, pipes, hoses, channels, or the like to create a continuous pathway for the flow of at least a fluid.

With continued reference to FIG. 1, injector 140 may include at least a fluid inlet 144. As used in this disclosure, a "fluid inlet" is an entry point through which at least a fluid is introduced into injector 140 before being fed into reaction region 128 of plasma reactor 116 or any other process described in this disclosure. In a non-limiting example, at least a fluid inlet 144 may be connected with outlet of at least a reservoir 112 as described above. In some cases, at least a fluid inlet 144 may be designed to provide a secure, leak-free connection with the at least reservoir; for instance, and without limitation, at least a fluid inlet 144 may be sealed using one or more sealing elements such as O-rings, gaskets, thread sealants, and the like to ensure a tight seal and/or prevent leaks or contamination. Injector 140 may include at least a fluid outlet 148. As used in this disclosure, a "fluid outlet" is an exit point through which at least a fluid is discharged from injector 140 into reaction region 128 of plasma reactor 116. In some cases, at least a fluid outlet 148 may be configured to allow at least a fluid to be released into the intended location within reaction region 128. For example, and without limitation, at least a fluid outlet 148 may be placed at the center and right above at least a pair of electrodes 120*a-b*. At least a fluid outlet 148 may be in a distance with at least a pair of electrodes 120*a-b* or reaction region 128. Such distance may impact the time and space available for at least a fluid to mix and interact with the plasma or other process components. In some cases, at least a fluid outlet 148 may be configured to provide an optimal flow pattern and dispersion of the at least a fluid into reaction region 128. In a non-limiting example, at least a fluid outlet 148 may include a nozzle (i.e., a specially-shaped opening) designed to create a directed, high-velocity stream of at least a fluid, which may improve mixing and dispersion in reaction region 128. Such a nozzle may include, without limitation, swirl nozzle, fan spray nozzle, impinging jet nozzle, multi-hole nozzle, atomizing nozzle, and the like.

Additionally, or alternatively, and still referring to FIG. 1, injector 140 may include one or more valves configured to monitor, control, or otherwise regulate the flow of at least a fluid fed through reaction region 128 of plasma reactor 116. As used in this disclosure, a "valve" is a component that controls fluidic communication between two or more components (e.g., between at least a reservoir 112 and injector 140). Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device as described in further detail below. Computing device may be in communication with valve, for example by way of one or more of electrical communication, hydraulic communication, pneumatic communication, mechanical communication, and the like. Further, injector 140 and elements thereof will be explained in greater detail below in this disclosure.

With continued reference to FIG. 1, apparatus 100 includes a pressure regulator 152 configured to transfer at least a fluid to injector. As used in this disclosure, a "pressure regulator" is a component designed to control and maintain the pressure of at least a fluid, wherein such pressure drives the flow of the at least a fluid into plasma reactor 116. In an embodiment, pressure regulation system may include an atmospheric pressure system. As used in this disclosure, an "atmospheric pressure system" is a mechanism that controls the pressure of the fluid being introduced into the plasma reactor around atmospheric pressure. "Atmospheric pressure," for the purpose of this disclosure, is the pressure exerted by the weight of air in the Earth's atmosphere at sea level, which is approximately 101.3 kilopascals (kPa) or 14.7 pounds per square inch (psi). In some embodiments, pressure regulator 152 may ensure that at least a fluid being injected into reaction region 128 of plasma reactor 116 is maintained at or near atmospheric pressure. In some embodiments, pressure regulator 152 may be responsible for transferring the fluid from at least a reservoir 112 to injector 140, providing a consistent and controlled flow of at least a fluid into reaction region 128 of plasma reactor 116.

With continued reference to FIG. 1, in some cases, pressure regulator 152 may include a flow component connected with at least a reservoir 112 configured to flow at least a fluid from at least a fluid inlet 144 of injector 140 or outlet of at least a reservoir 112 to at least a fluid outlet 148 of injector 140. Pressure regulator 152 may include the valves described above. In some embodiments, flow component may include a passive flow component configured to initiate a passive flow process. As used in this disclosure, a "passive flow component" is a component that imparts a passive flow on at least a fluid, wherein the "passive flow," for the purpose of this disclosure, is flow of fluid, which is induced absent any external actuators, fields, or power sources. A "passive flow process," as described herein, is a plurality of actions or steps taken on passive flow component in order to impart a passive flow on at least a fluid. In a non-limiting example, with pressure regulator 152 including passive flow component, injector 140 may be able to feed at least a fluid through reaction region 128 as a function of passive flow process. Passive flow component may employ one or more passive flow techniques in order to initiate passive flow process; for instance, and without limitation, passive flow techniques may include osmosis, capillary action, surface tension, pressure, gravity-driven flow, hydrostatic flow, vacuums, and the like. Passive flow component may be in fluidic communication with at least a reservoir 112.

Still referring to FIG. 1, in other embodiments, a flow component may include an active flow component configured to initiate an active flow process. As used in this disclosure, an "active flow component" is a component that imparts an active flow on a fluid, wherein the "active flow," for the purpose of this disclosure, is flow of fluid which is induced by external actuators, fields, or power sources. An "active flow process," as described in this disclosure, is a plurality of actions or steps taken on active flow component in order to impart active flow on at least a fluid. In some embodiments, active flow component may be electrically connected to power source as described above. In a non-limiting example, with pressure regulator 152 including active flow component, injector 140 may be able to feed at least a fluid through reaction region 128 as a function of active flow process. Atmospheric pressure system 152 may be configured to pressurize at least a fluid entering reaction region 128 of plasma reactor 116; for instance, and without limitation, active flow component of pressure regulator 152 may include one or more pumps. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation, an electric motor or a power take off from power source. Pump may be in fluidic communication with at least a reservoir 112.

With continued reference to FIG. 1, apparatus 100 may further include a condenser 156 disposed within reaction region above or below treatment chamber. As used in this disclosure, a "condenser" is a component configured to collect reactive products generated from electric discharge within reaction region 128 of plasma reactor 116. Condenser 156 may be made of steel wool, metal wool, copper, carbon steel and the like. Condenser 156 may be located at or near the outlet and/or may be mounted at the bottom of the reaction region 128 in order to allow for vaporized water to condense to water droplets. In an embodiment, condenser 156 may be a piece of steel wool that is placed in the bottom of apparatus 100 or into a conduit or pipe connected to it. In some cases, condenser 156 may be disposed inside a conduit. In an embodiment, condenser 156 may not be an external component but may be integrated within a conduit itself wherein the conduit may include a pipe that allows for the flow of fluids such as gases or liquids, from one part of the condenser 156 to another or from the condenser 156 to another component of apparatus 100. In some embodiments, condenser 156 may be strategically placed between reaction region 128 configured to collect reactive products before they come into contact with growth medium 104 contained in treatment chamber 108. In some cases, reactive products may include ions, free radicals, electrons, excited molecules, and the like as described above; for instance, and without limitation, ROS and/or RNS. In other cases, reactive products may include byproducts or waste products produced during the treatment process. In a non-limiting example, reactive products may include carbon monoxide (CO) and/or carbon dioxide (CO2), wherein these gases may be produced as a result of the decomposition of growth medium 104 or the reaction of electrical discharge with impurities in growth medium 104. Other exemplary byproducts or waste products may include, without limitation, ozone, volatile organic compounds (VOCs), and the like.

With continued reference to FIG. 1, condenser 156 may include a cooling chamber. As used in this disclosure, a "cooling chamber" is a component configured to rapidly cool reactive products coming (i.e., falling) from reaction region 128 of plasma reactor. In some embodiments, cooling chamber may be configured to ensure efficient heat transfer and maintain optimal temperature conditions for the condensation process. Cooling chamber may be constructed from materials with thermal conductivity, such as, without limitation, copper, aluminum, stainless steel, and the like. In some cases, materials may also be chemically resistant to reactive products and at least a fluid used in the system. Cooling chamber may be non-conductive and constructed from materials such as, without limitation, plastics, glass, fiberglass and the like. In some embodiments, cooling chamber of condenser 156 may be designed in a shape consistent with the shape of plasma reactor 116 or treatment chamber 108; for instance, and without limitation, cooling chamber may be designed in a cylindrical shape, consistent with the shape of plasma reactor 116 and treatment chamber 108 to optimize the flow of reactive products and maximize a contact surface area between a cooling medium and reactive products, wherein the cooling medium may include water, air, refrigerant, and/or the like configured to remove heat from reactive products efficiently. In some cases, interior of cooling chamber may be equipped with fins, coils, plates, and/or the like to further enhance the heat transfer process (i.e., by increasing the surface area of the cooling chamber). In a non-limiting example, cooling chamber may include a heat exchanger, wherein the heat exchanger may be configured to facilitate the transfer of heat from reactive products to the cooling medium.

With continued reference to FIG. 1, condenser 156 may include a collection surface. As used in this disclosure, a "collection surface" is a designated area within condenser 156 where reactive products come into contact with the cooling chamber and undergo a phase change, transitioning from a first state to a second state. In a non-limiting example, collection surface may be configured to enable reactive products in gaseous state to transit to liquid state. Such transition may allow apparatus 100 to efficiently collect and subsequently handle or transport condensed substances. In some embodiments, collection surface may include various surface features such as, without limitation, ridges, channels, and the like to facilitate the flow of condensed/collected substances. In a non-limiting example, collection surface may include a flat surface, wherein the flat surface may include a plurality of channels or grooves designed to facilitate the flow of condensed reactive products away from collection surface. Additionally, or alternatively, collection surface may include a surface finish; for instance, and without limitation, collection surface may be finished or treated (e.g., using hydrophobic coating, hydrophilic coating, and/or the like) to enhance the wetting properties and reduce surface tension, thereby improving condensation efficiency and fluid flow further.

With continued reference to FIG. 1, condenser 156 may include at least a conduit. As used in this disclosure, a "conduit" is a passageway for substances (i.e., condensed reactive products) to move from one location to another location within apparatus 100. In a non-limiting example, condenser 156 may use one or more conduits to transfer condensed reactive products from collection surface to growth medium 104 contained in treatment chamber 108. In some cases, conduit may be designed with a circular cross-sectional shape. In some cases, conduit may be thermally insulated to maintain a desired temperature of the condensed reactive products and/or prevent any unwanted chemical reactions during transport using material such as fiberglass. In some embodiments, one or more conduits may be connected to collection surface in a manner that ensures a leak-proof connection; for instance, and without limitation, such connection between collection surface and one or more conduits may be established using threaded fittings, compression fittings, flange, and the like. In some embodiments, one or more conduits may be routed from collection surface to treatment chamber 108 with minimized interference with other components of apparatus 100 to ensure a smooth flow of the condensed reactive products; for instance, and without limitation, proper support and/or anchoring of conduits may be installed to prevent conduits from sagging, vibrating, experiencing any other mechanical stress that could cause leaks or damages. Additionally, or alternatively, conduits may incorporate one or more valves to regulate the flow of condensed reactive products into treatment chamber 108. Valves may include any valves described in this disclosure. Persons skilled in the art, upon reviewing the entirety of this disclosure, will be aware of various devices/components that may be used within condenser 156 of apparatus 100.

With continued reference to FIG. 1, apparatus 100 may include a computing device configured to control various internal components as described above, such as, without limitation, plasma reactor 116, ignition unit 132, injector 140, condenser 156, and the like. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of apparatus 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, internal components of apparatus 100 may be in communication with the computing device using one or more signals. As used in this disclosure, a "signal" is a human-intelligible and/or machine-readable representation of data, for example and without limitation an electrical and/or digital signal from one device to another; signals may be passed using any suitable communicative connection. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Further referring to FIG. 1, in some cases, apparatus 100 and/or computing device may perform one or more signal processing steps on a signal. For instance, apparatus 100 and/or computing device may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, phase-locked loops, and/or any other process using operational amplifiers or other analog circuit elements. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, apparatus 100 may include a housing 160 configured to house various internal components such as, without limitation, treatment chamber 108, plasma reactor 116, ignition unit 132, injector 140, pressure regulator 152, condenser 156, computing device, and the like thereof. As used in this disclosure, a "housing" is an outer structure or enclosure that contains and supports various internal components of apparatus 100. In some cases, housing 160 may provide protection, stability, and/or organization to apparatus 100. In an embodiment, housing 160 may be designed to accommodate and securely hold internal components of apparatus 100. In some cases, housing 160 may include a plurality of layers, wherein one or more internal components of apparatus 100 may be strategically placed into each layer of plurality of layers, thereby minimizing physical or functional interference between internal components of apparatus 100. In a non-limiting example, housing 160 may include a first layer incorporating ignition unit 132, a second layer incorporating injector 140, a third layer incorporating plasma reactor 116, and a fourth layer incorporating treatment chamber 108 containing growth medium 104. Each layer may be physically isolated but functionally connected in various means (e.g., fluidic connection, electrical connection, and the like thereof); for instance and without limitation, continuous conductor 136 may be used to connect ignition unit 132 and at least an electrode of at least a pair of electrode 120*a*-*b* of plasma reactor 116 configured to transmit electrical power from first layer of housing 160 to third layer of housing 160, wherein continuous conductor may travel from first layer of housing 160 to third layer of housing 160 through second layer of housing 160 externally. For another instance, and without limitation, at least a fluid outlet 148 of injector 140 may be mechanically fixed to the bottom of second layer or top of third layer of housing 160, wherein the at least a fluid outlet 148 may include a first end connected to injector 140 and a second end extended into third layer of housing 160 that incorporates plasma reactor 116. In such embodiment, at least a fluid contained within at least a reservoir 112 may be introduced into plasma reactor 116 and further through reaction region 128 from second layer of housing 160 to third layer of housing 160. Additionally, or alternatively, housing 160 may include a proper insulation of the electrode wire (continuous conductor 136) configured to prevent electrical shorts or interference with other components in housing 160. In a non-limiting example, an insulator may be used at a point where continuous conductor 136 passes through housing 160, as described in further detail with reference to FIG. 2.

Figure 2:
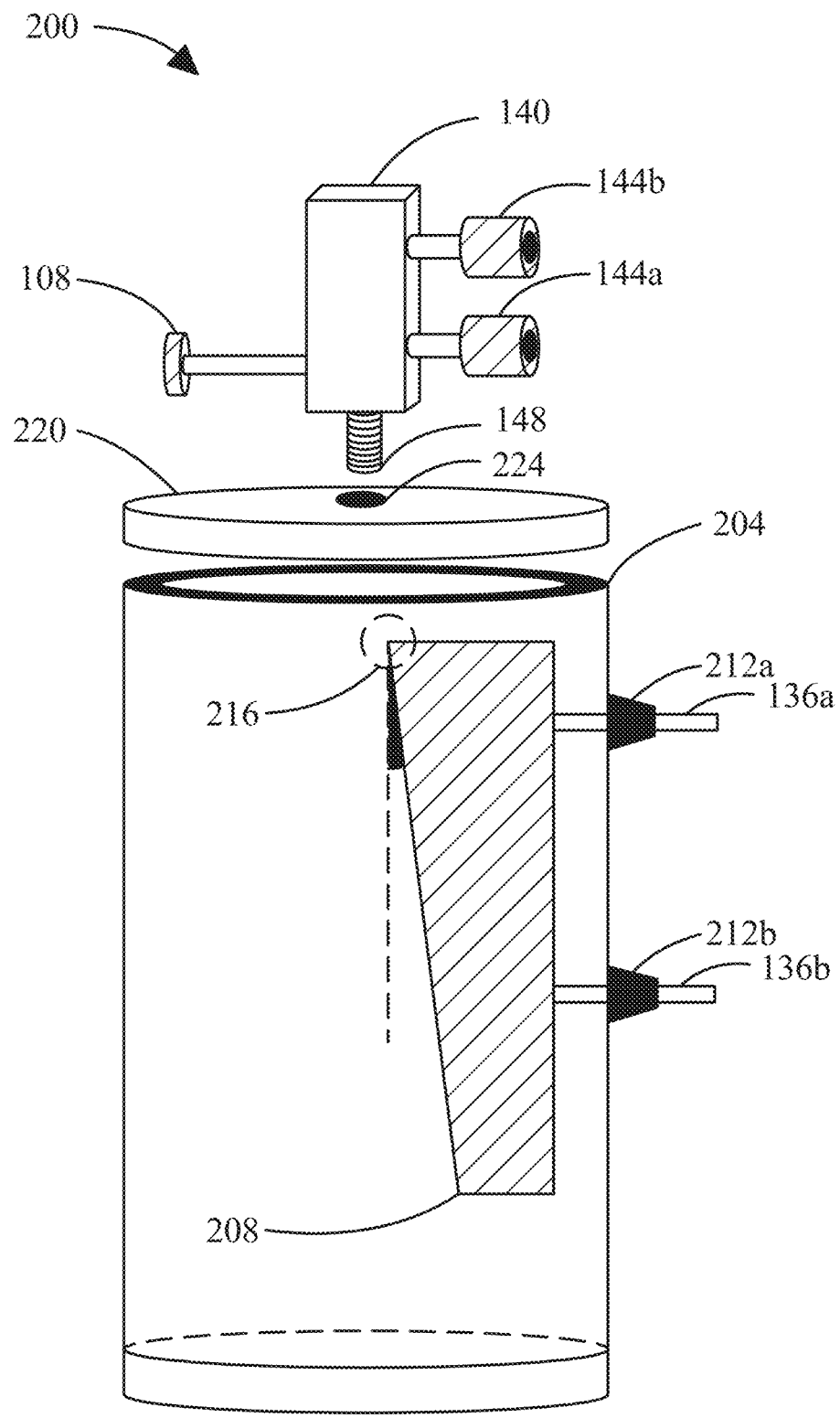
FIG. 2 is an exemplary embodiment of a plasma reactor assembly.

Now referring to FIG. 2, an exemplary FIG. 2 is an exemplary embodiment of a plasma reactor assembly 200. Plasma reactor assembly 200 may include a housing 204. In an embodiment, housing 204 may be a portion of housing 160 as described above. In another embodiment, housing 204 may be a separate housing configured to only house plasma reactor 116. In a non-limiting example, plasma reactor 116 may be double-housed, wherein housing 204 may be disposed within third layer of housing 160 as illustrated in FIG. 1. At least a pair of electrodes 120*a*-*b* and reaction region 128 in between electrodes of at least a pair of electrodes 120*a*-*b* may be disposed within housing 204. In some cases, housing 204 may be injection molded via an injectable mold. As used in this disclosure, an "injectable mold" is a manufacturing tool for producing plastic parts. Manufacturing housing 204 may include using an injection molding process, wherein the injection molding process may involve a use of injectable mold configured to create specific shape and features of housing 204. In some embodiments, injectable mold may include two halves that are clamped together, with one or more cavities in between, wherein the cavities may define the shape of housing 204. In some cases, material such as, without limitation, molten plastic may be injected into the injectable mold under high pressure, filling the space and taking on the shape of injectable mold. Injection molding process may include a cooling process which is configured to cool and/or solidify injected material. Injectable mold may be then opened and finished housing 204 may be removed. In some embodiments, injectable mold may be precisely machined to desired shape and size of housing 204. In a non-limiting example, housing 204 may include a hollow cylinder.

With continued reference to FIG. 1, one or more continuous conductor 136*a*-*b* may pass through housing 204, with one end electrically connected to at least an electrode 208 of at least a pair of electrodes 120*a*-*b*. In some cases, at least an electrode 208 may include a first electrode 120*a*. In other cases, at least an electrode 208 may include second electrode 120*b*. Another end of continuous conductor 136*a*-*b* may be connected to ignition unit 132 or ground 124 as described above with reference to FIG. 1. In some embodiments, one or more insulators 212*a*-*b* may be used at the point where continuous conductor 136*a*-*b* passes through housing 204. An "insulator," for the purpose of this disclosure, is a material that does not readily conduct heat, electricity, or sound. In a non-limiting example, insulators 212*a*-*b* may include electrical insulators, wherein the electrical insulators are material that have high electrical resistivity. Electrical insulators may not readily conduct electric current, thereby preventing the flow of electricity between plasma reactor 116 with other components except ignition unit 132, reducing the risk of short circuits, electrical shocks, interference, and the like. Exemplary electrical insulator may include plastics, ceramics, glass, rubber, and the like.

With continued reference to FIG. 2, each electrode of at least a pair of electrodes 120*a*-*b* may include a pitch angle 216. In a non-limiting example, at least an electrode 208 may include a pitch angle 216 of 12 degrees. As used in this disclosure, a "pitch angle" of an electrode refers to an angle between the electrode's longitudinal axis and a reference plane or axis within plasma reactor 116. In an embodiment, the cone shape of the injector discharge may be between 12 degrees and 15 degrees and the pitch angle of the electrode 208 may be between 6 degrees and 8 degrees. In an embodiment, the injector pitch may match the electrode 208 or vice versa. In some cases, pitch angle 216 may impact on characteristics of plasma generated between electrodes in reaction region 128 such as, without limitation, electric field distribution, efficiency of electrical discharge process, interaction with reactive species (e.g., ROS, RNS, and the like) within the plasma.

With continued reference to FIG. 2, injector 140 may be connected to plasma reactor 116 via an injector mount flange 220. As used in this disclosure, an "injector mount flange" is a mechanical component used to securely attach injector 140 to housing 204 in a reliable and leak-proof manner. In a non-limiting example, injector mount flange 220 may include an interface 224 between injector 140 and plasma reactor 116. In some cases, at least a fluid outlet 148 of injector 140 may include a threaded adaptor. Both at least a fluid outlet 148 and interface 224 may include a threaded section; for instance, and without limitation, at least a fluid outlet 148/interface 224 may include a male/female threaded section, wherein the male and the female threaded section are compatible (i.e., matched). Injector 140 may be threaded, via at least a fluid outlet 148 with threaded adaptor onto injector mount flange 220 at interface 224. In an embodiment, the bottom of the injector 140 may be a fluid outlet 148 having an opening at the bottom which allows the gas and water to exit in a controlled spray cone. The outside of the fluid outlet 148 may be threaded. The mount flange 220 may feature an interface 224 with matching threads in the center of it allowing for the injector 140 to securely connect to it. In an embodiment, the position of the fluid outlet 148 in the mount flange 220 may allow for the release of the gas and water to exit directly into the center of the reaction region 128.

Figure 3:
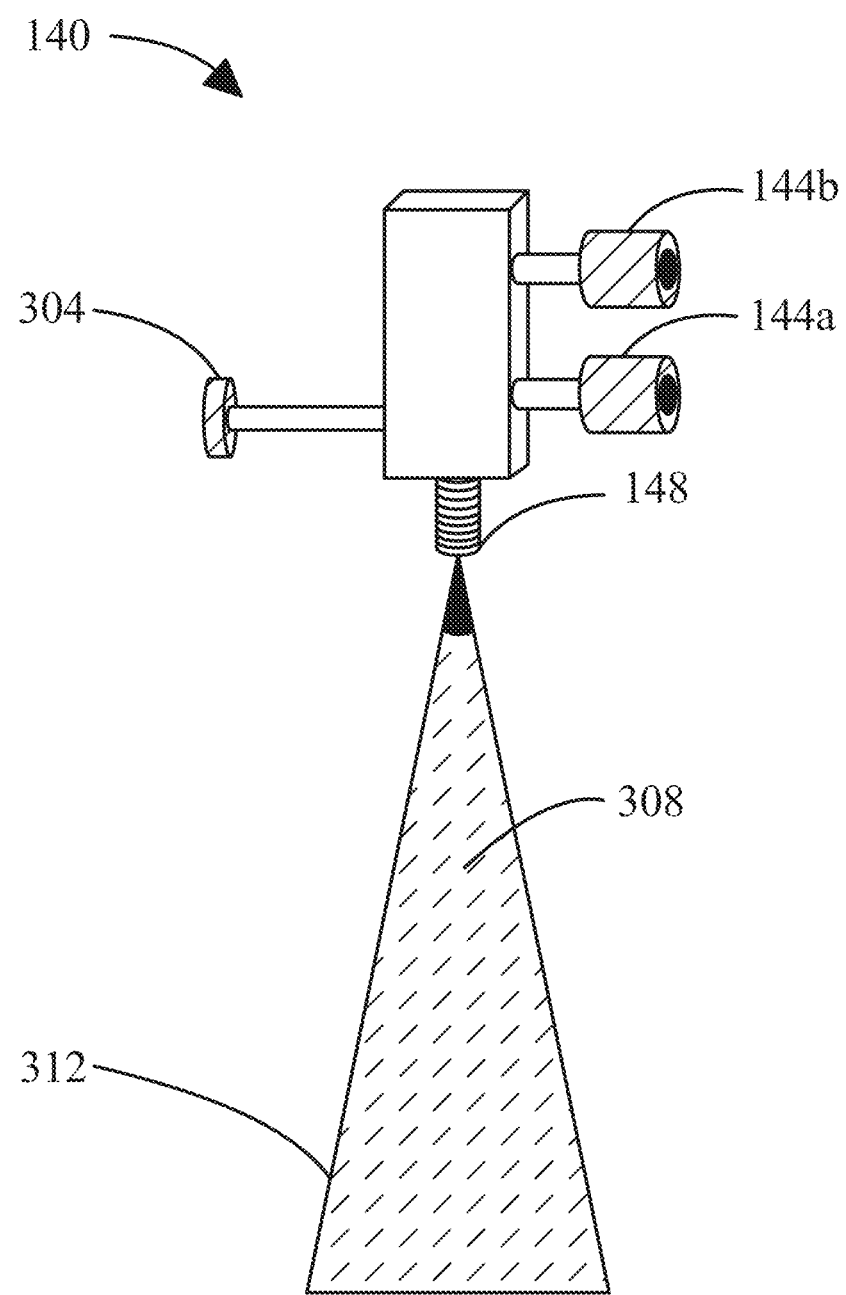
FIG. 3 is an exemplary embodiment of an injector with a flow adjustment component.

Now referring to FIG. 3, an exemplary embodiment of an injector 140 with a flow adjustment component 304 is illustrated. In some embodiments, injector 140 may include a plurality of fluid inlets 144*a*-*b*. In a non-limiting example, injector 140 may include a first fluid inlet 144*a* in fluidic connection with first reservoir, wherein the first fluid inlet may be configured to accept first fluid from first reservoir. First fluid may include one or more gases as described above. Injector 140 may include a second fluid inlet 144*b* in fluidic connection with second reservoir, wherein second fluid inlet 144*b* may be configured to accept second fluid from second reservoir. Second fluid may include liquid such as, without limitation, water. In some cases, at least a fluid outlet 148 may be configured to output a mixture of first fluid and second fluid in the form of droplets to plasma reactor. As used in this disclosure, "droplets" refer to small, spherical-shaped liquid particles. In a non-limiting example, injector 140 may produce droplets through different mechanisms, such as, without limitation, pressure-driven atomization, ultrasonic atomization, electrostatic atomization, and the like. Injector 140 may break second fluid down into small droplets which may then be dispersed and mixed with first fluid. In some cases, droplets may carry reactants into reaction region 128 of plasma reactor 116. In some cases, droplets may enhance the mixing and interaction between different fluids or reactive species within plasma reactor, thereby improving the efficiency and/or uniformity of the treatment process.

With continued reference to FIG. 3, as used in this disclosure, a "flow adjustment component" is a device that allows for the precise control and regulation of the fluid flow rate through the injector. In some cases, flow adjustment component 304 may include a manual flow control valve which can be adjusted by hand to regulate the fluid flow rate through injector 140. In a non-limiting example, by turning a knob, valve opening or the opening of at least a fluid outlet 148 may be changed, allowing for more or less fluid to pass through injector 140 or introduce into plasma reactor 116. Additionally, or alternatively, flow adjustment component 304 may include an 8X turn-down ratio. As used in this disclosure, a "turn-down ratio" is a measure of the versatility and flexibility of flow adjustment component 304 which indicates how well flow adjustment component 304 may accommodate different flow rate requirements within a system. Such flow adjustment component 304 may control fluid flow rate over a range of eight times the minimum flow rate. For example, if the minimum flow rate of flow adjustment component 304 is 1 gallon per minute (GPM), an 8× turn-down ratio may indicate that flow adjustment component 304 may be able to effectively regulate flow rates from 1 GPM up to 8 GPM. In a non-limiting example, at least a fluid outlet 148 of injector 140 may output gas and 5~8μ water drops 308 in a 12~15 degree spray cone 312. In an embodiment, the fluid adjustment component 304 may terminate the fluid flow.

Figure 4:
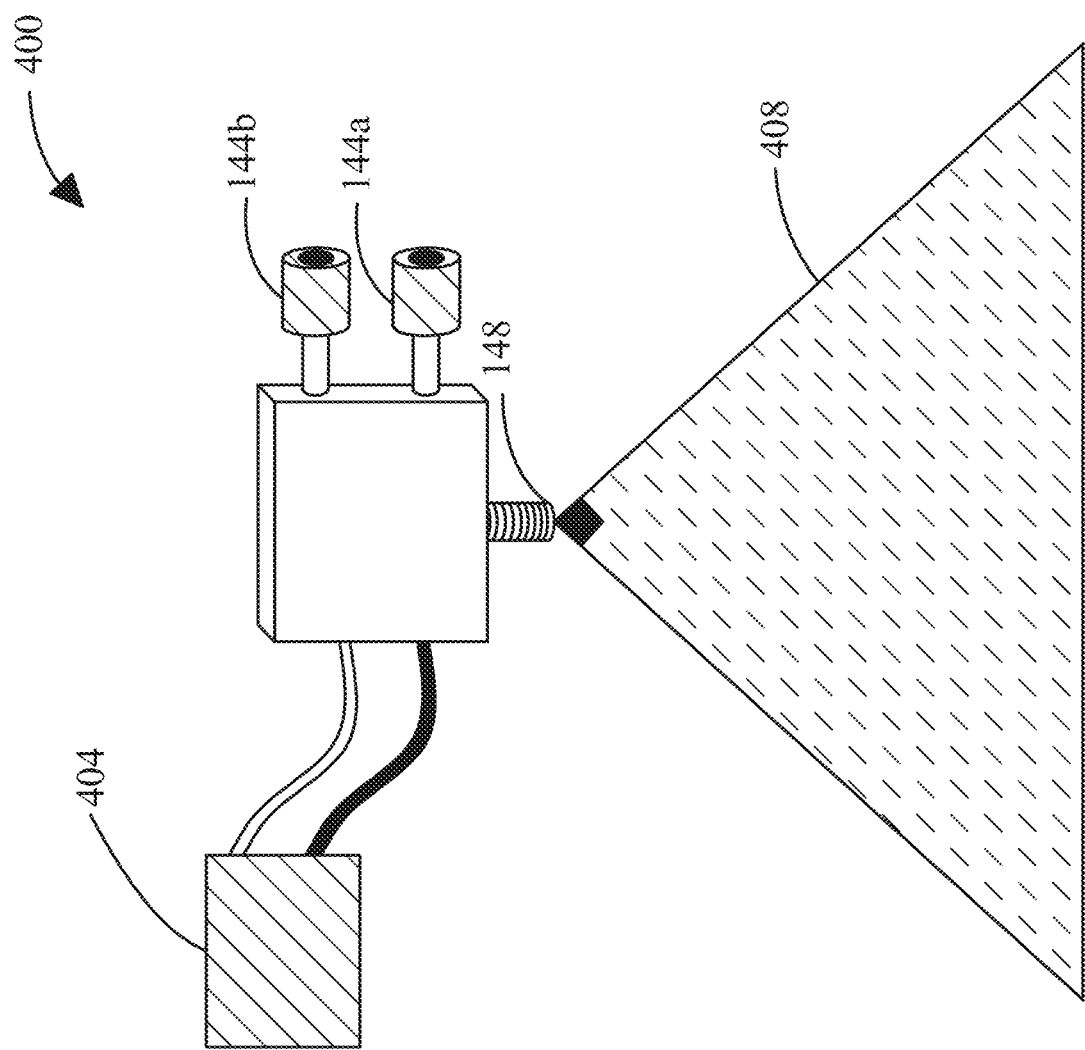
FIG. 4 is an exemplary embodiment of a piezo water vapor injector.

Now referring to FIG. 4, an exemplary embodiment of a piezo water vapor injector 400 is illustrated. As used in this disclosure, a "piezo water vapor injector" is a type of injector 140 that utilizes piezoelectric technology to generate water vapor by atomizing at least a liquid (i.e., second fluid) into fine droplets as described above. "Water vapor," as described herein, is the gaseous phase of water (i.e., second fluid), which occurs when water molecules gain enough energy to break free from liquid state and become dispersed in surrounding air (i.e., first fluid). "Piezoelectric technology," as described herein, is a technology based on a piezoelectric effect: a phenomenon where certain materials generated an electric charge when subjected to mechanical stress or other way around (i.e., undergo mechanical deformation when exposed to electric field). In some cases, materials such as ceramics (e.g., lead zirconate titanate), quartz crystals, polymers, and the like may exhibit such an effect. Piezo water vapor injector 400 may include a piezoelectric element; for instance, and without limitation, a ceramic disk or plate may be used to create mechanical vibrations at certain frequencies when an electrical voltage is applied by power source 404. Power source 404 may include any power source as described above in this disclosure such as a DC power supply. Mechanical vibrations may be transmitted to at least a fluid input from at least a fluid inlet (i.e., first fluid inlet 144a and/or second fluid inlet 144b), thereby causing at least a fluid to break up into fine droplets of mist, which then evaporate to form water vapor. In a non-limiting example, at least a fluid outlet 148 of piezo water vapor injector 400 may output at least 90 degrees water vapor and air discharge cone. In an embodiment, piezo water vapor injector 400 may have a single inlet which is only for water. In an embodiment, the piezo water vapor injector 400 may discharge into a chamber that features a port where water enters and a second port where air and water vapor exit into reaction region 128. In another embodiment, piezo water vapor injector 400 may dispense water vapor directly into a plasma reactor 116 and a second gas only injector may discharge directly into the reaction region 128.

Figure 5:
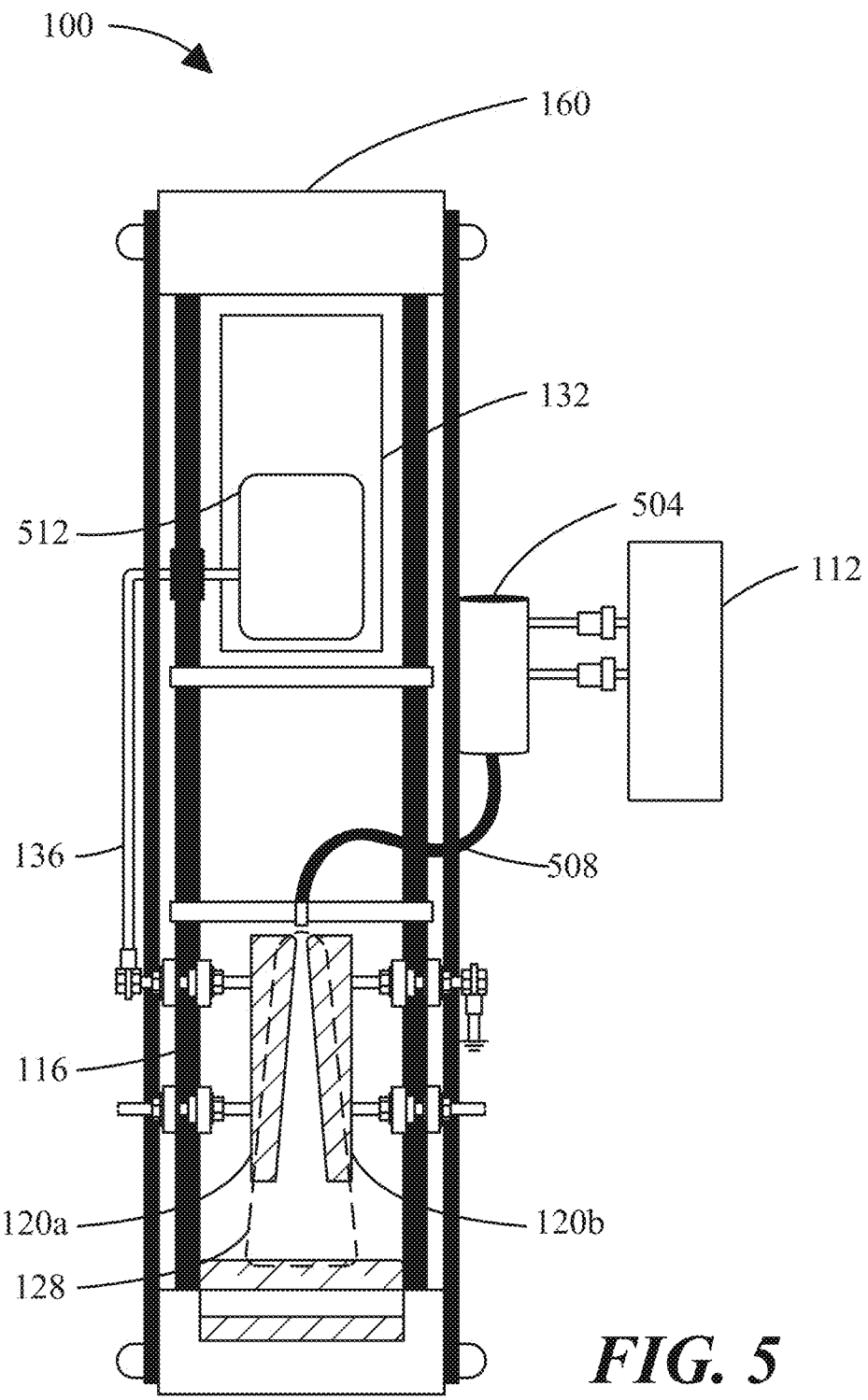
FIG. 5 is an exemplary embodiment of an apparatus for treating a growth medium via an electrical discharge with an external mounted injector.

Now referring to FIG. 5, an exemplary embodiment of apparatus 100 for treating a growth medium via an electrical discharge with an external mounted injector 504 is illustrated. As used in this disclosure, an "external mounted injector" is an injector that is installed on the exterior of apparatus 100, rather than being integrated within apparatus 100 as described above with reference to FIGS. 1-4. External mounted injector 504 may include any injector as described above such as, without limitation, injector 140 (air & water injector), Piezo water vapor injector 400, and the like. In some embodiments, external mounted injector 504 may be designed to deliver at least a fluid from at least a reservoir 112 into plasma reactor 116 from an external location via a tube 508. In a non-limiting example, external mounted injector 504 may be mechanically fixed to the exterior of housing 160. In some cases, external mounted injector 504 may be attached to exterior of housing 160 via screw or bolt fastening, clamp or clip fastening, sliding or snap-fit connections, and/or the like.

Additionally, or alternatively, and still referring to FIG. 5, ignition unit 132 may include a coil 512. As used in this disclosure, a "coil" is a wound spiral or helix of conductive wire that creates an electromagnetic field when an electric current flows through it. In a non-limiting example, coil 512 may be electrically connected to at least an electrode (i.e., first electrode 120a) of at least a pair of electrodes 120a-b, configured to initiate electrical discharge in plasma reactor 116. Coil may include an induction coil or a high-voltage transformer coil, wherein the induction coil or the high-voltage transformer coil may generate high-voltage electrical pulses necessary to create electrical discharge between first electrode 120a and second electrode 120b.

Figure 6:
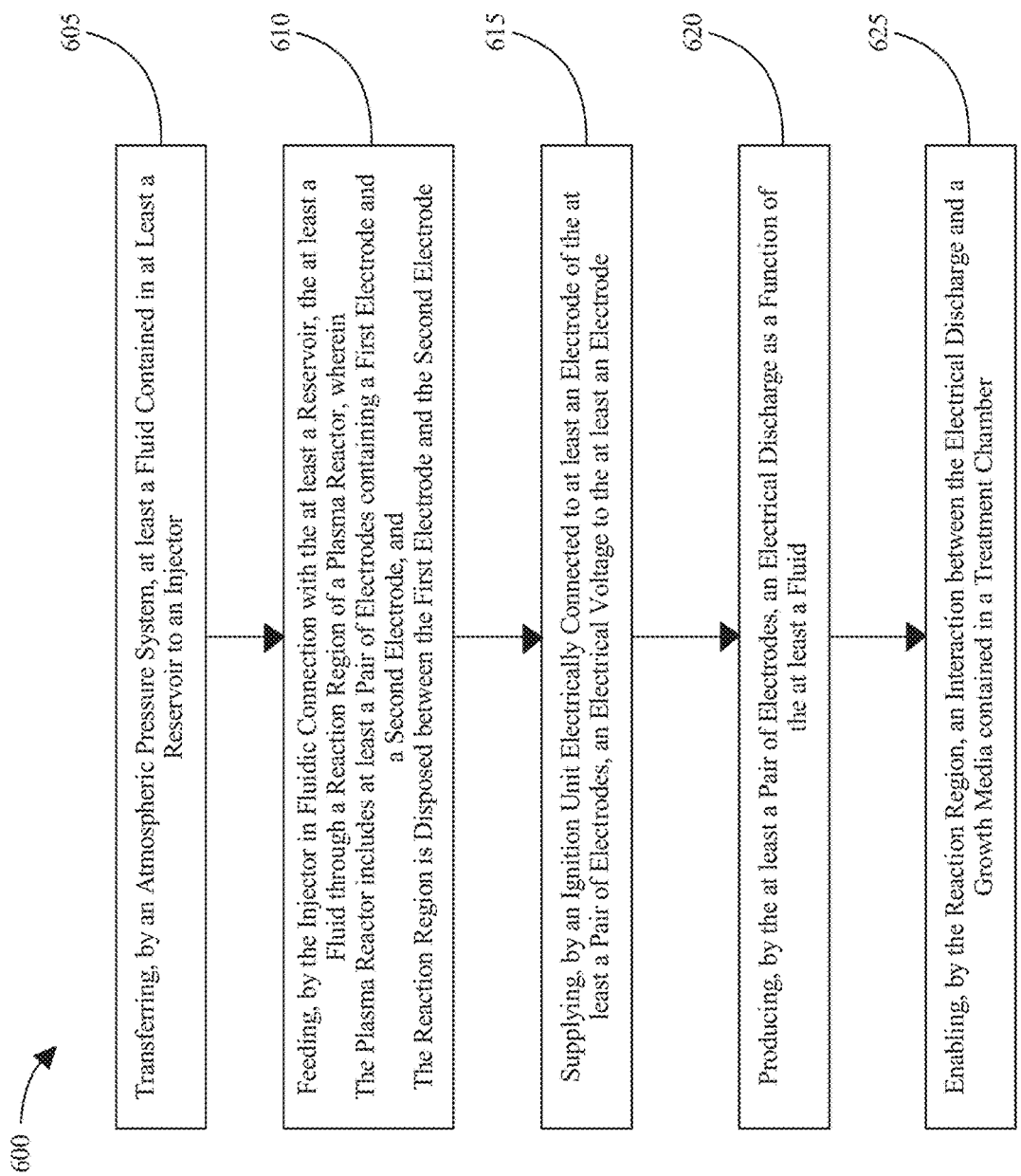
FIG. 6 is an exemplary embodiment of a method for treating a growth medium via an electrical discharge.

Now referring to FIG. 6, a flow diagram of an exemplary embodiment of a method 600 for treating a growth medium via an electrical discharge is illustrated. Method 600 includes step 605 of transferring, by an atmospheric pressure system, at least a fluid contained in at least a reservoir to an injector. In some embodiments, the at least a reservoir may include a first reservoir configured to contain a first fluid, and a second reservoir configured to contain a second fluid, wherein the first fluid may include at least a gas, and the second fluid may include at least a liquid. In some embodiments, the pressure regulator may be configured to pressurize the at least a fluid entering the reaction region. This may be implemented, without limitation, as described above in reference to FIGS. 1-5.

With continued reference to FIG. 6, method 600 includes a step 610 of feeding, by the injector in fluidic connection with the at least a reservoir, the at least a fluid through a reaction region of a plasma reactor, wherein the plasma reactor may include at least a pair of electrodes containing a first electrode and a second electrode, and the reaction region is disposed between the first electrode and the second electrode. In some embodiments, the injector may include a first fluid inlet in fluidic connection with the first reservoir, wherein the first fluid inlet is configured to accept the first fluid from the first reservoir, a second fluid inlet in fluidic connection with the second reservoir, wherein the second fluid inlet is configured to accept the second fluid from the second reservoir, and at least a fluid outlet configured to output a mixture of the first fluid and the second fluid in a form of droplets to the plasma reactor. The method of claim 11, wherein the injector comprises a flow adjustment component configured to regulate the flow of the at least a fluid entering the reaction region. This may be implemented, without limitation, as described above in reference to FIGS. 1-5.

With continued reference to FIG. 6, method 600 includes step 615 of supplying, by an ignition unit electrically connected to at least an electrode of the at least a pair of electrodes, an electrical voltage to the at least an electrode. In some embodiments, the ignition unit may include an ignition circuit configured to converts electrical power received from a power source into a high-voltage discharge of 6 kV to 30 kV. This may be implemented, without limitation, as described above in reference to FIGS. 1-5.

With continued reference to FIG. 6, method 600 includes step 620 of producing, by the at least a pair of electrodes, an electrical discharge as a function of the at least a fluid. In some embodiments, the first electrode of the at least a pair of electrodes may be configured to diverge from the second electrode of the at least a pair of electrodes. In some embodiments, each electrode of the at least a pair of electrodes may include a pitch angle of 12 degrees. In another embodiment, the pitch angle of the electrodes may be between 6 degrees and 8 degrees and the spray cone of the injector may be between 12 degrees to 15 degrees. In some embodiments, the reaction region may include a plurality of points of arc between the first electrode of the at least a pair of electrodes and the second electrode of the at least a pair of electrodes. This may be implemented, without limitation, as described above in reference to FIGS. 1-5.

With continued reference to FIG. 6, method 600 includes step 625 of enabling, by the reaction region, an interaction between the electrical discharge and a growth medium contained in a treatment chamber. This may be implemented, without limitation, as described above in reference to FIGS. 1-5.

With continued reference to FIG. 6, method 600 may include a step of collecting, using a condenser disposed within the reaction region above the treatment chamber, reactive species generated during the production of the electrical discharge in the reaction region. Method 600 may further include a step of transferring, using the condenser, the reactive species to the treatment chamber. This may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
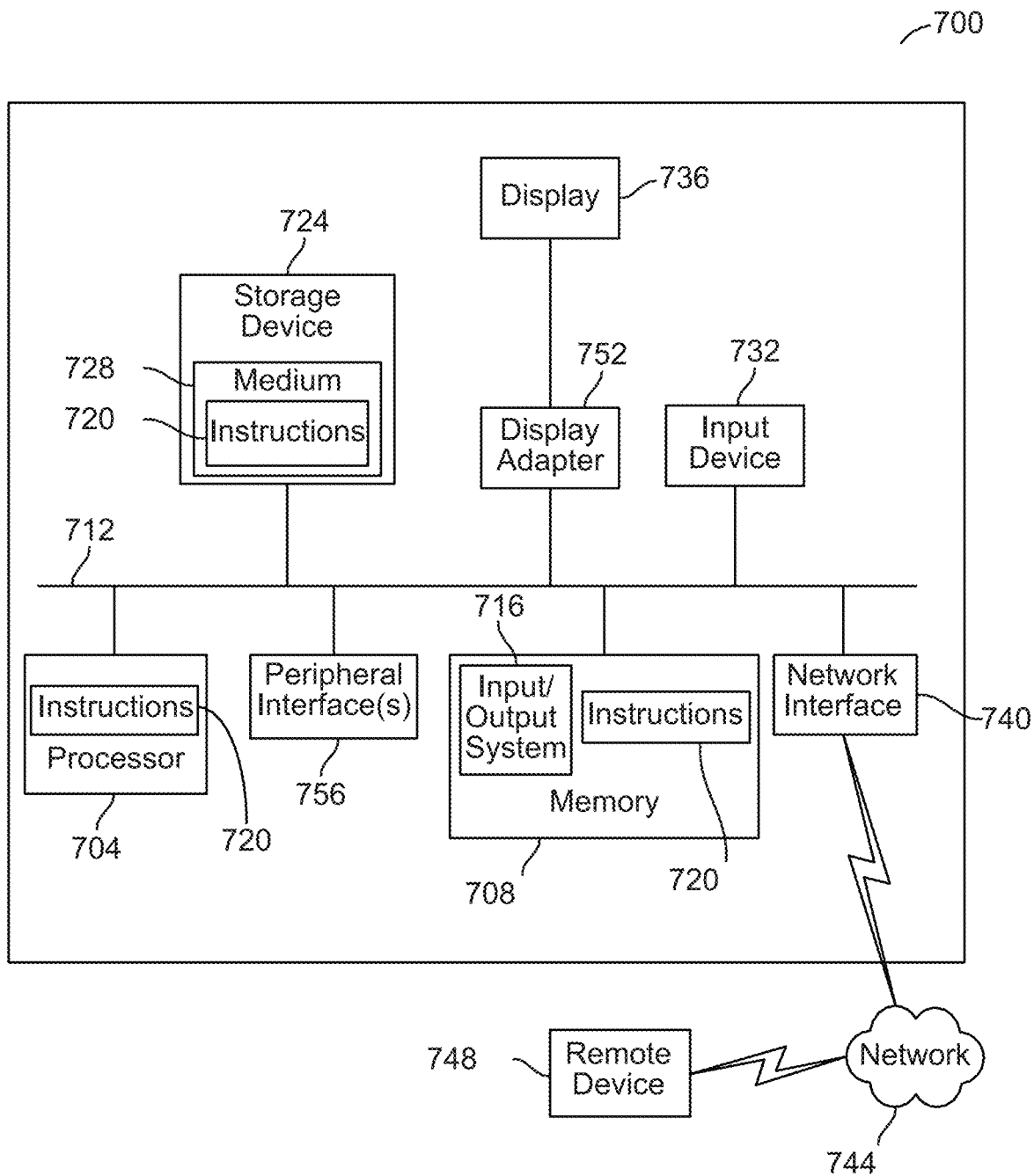
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for treating a growth medium via an electrical discharge, the apparatus comprises:
    a treatment chamber configured to contain a growth medium;
    at least a reservoir configured to contain at least a fluid;
    a plasma reactor, wherein the plasma reactor comprises:
        at least a pair of electrodes comprising a first electrode and a second electrode, wherein the at least a pair of electrodes is configured to produce an electrical discharge as a function of the at least a fluid; and
        a reaction region disposed between the first electrode and the second electrode, wherein the reaction region is configured to enable an interaction between the electrical discharge and a growth medium;
    an ignition unit electrically connected to at least an electrode of the at least a pair of electrodes, wherein the ignition unit is configured to supply an electrical voltage to the at least an electrode;
    an injector in fluidic connection with the at least a reservoir, wherein the injector is configured to feed at least a fluid through the reaction region; and
    a pressure regulator configured to transfer at least a fluid to the injector.

2. The apparatus of claim 1, wherein the at least a reservoir comprises:
    a first reservoir configured to contain a first fluid; and
    a second reservoir configured to contain a second fluid, wherein:
        the first fluid comprises at least a gas; and
        the second fluid comprises at least a liquid.

3. The apparatus of claim 2, wherein the injector comprises:
    a first fluid inlet in fluidic connection with the first reservoir, wherein the first fluid inlet is configured to accept the first fluid from the first reservoir;
    a second fluid inlet in fluidic connection with the second reservoir, wherein the second fluid inlet is configured to accept the second fluid from the second reservoir; and
    at least a fluid outlet configured to output a mixture of the first fluid and the second fluid in a form of droplets to the plasma reactor.

4. The apparatus of claim 1, wherein the first electrode of the at least a pair of electrodes is configured to diverge from the second electrode of the at least a pair of electrodes.

5. The apparatus of claim 1, wherein each electrode of the at least a pair of electrodes comprises a pitch angle of 12 degrees.

6. The apparatus of claim 1, wherein the reaction region comprises a plurality of points of arc between the first electrode of the at least a pair of electrodes and the second electrode of the at least a pair of electrodes.

7. The apparatus of claim 1, wherein the injector comprises a flow adjustment component configured to regulate the flow of the at least a fluid entering the reaction region.

8. The apparatus of claim 1, wherein the pressure regulator is configured to pressurize the at least a fluid entering the reaction region.

9. The apparatus of claim 1, wherein the ignition unit comprises:
    an ignition circuit configured to convert electrical power received from a power source into a high-voltage discharge of 6 kV to 30 kV.

10. The apparatus of claim 1, wherein the apparatus comprises:
    a condenser disposed within the reaction region above the treatment chamber, wherein the condenser is configured to:
        collect reactive species generated during the production of the electrical discharge in the reaction region; and
        transfer the reactive species to the treatment chamber.

11. The method of claim 1, wherein the method further comprises:
    collecting, using a condenser disposed within the reaction region above the treatment chamber, reactive species generated during the production of the electrical discharge in the reaction region; and
    transferring, using the condenser, the reactive species to the treatment chamber.

12. A method for treating a growth medium via an electrical discharge, the method comprises:
    transferring, by an atmospheric pressure system, at least a fluid contained in at least a reservoir to an injector;
    feeding, by the injector in fluidic connection with the at least a reservoir, the at least a fluid through a reaction region of a plasma reactor, wherein:
        the plasma reactor comprises at least a pair of electrodes containing a first electrode and a second electrode; and
        the reaction region is disposed between the first electrode and the second electrode; supplying, by an ignition unit electrically connected to at least an electrode of the at least a
    pair of electrodes, an electrical voltage to the at least an electrode;
    producing, by the at least a pair of electrodes, an electrical discharge as a function of the at least a fluid; and
    enabling, by the reaction region, an interaction between the electrical discharge and a growth medium contained in a treatment chamber.

13. A The method of claim 12, wherein the at least a reservoir comprises:
    a first reservoir configured to contain a first fluid; and
    a second reservoir configured to contain a second fluid, wherein:
        the first fluid comprises at least a gas; and
        the second fluid comprises at least a liquid.

14. The method of claim 13, wherein the injector comprises:
    a first fluid inlet in fluidic connection with the first reservoir, wherein the first fluid inlet is configured to accept the first fluid from the first reservoir;
    a second fluid inlet in fluidic connection with the second reservoir, wherein the second fluid inlet is configured to accept the second fluid from the second reservoir; and
    at least a fluid outlet configured to output a mixture of the first fluid and the second fluid in a form of droplets to the plasma reactor.

15. The method of claim 12, wherein the first electrode of the at least a pair of electrodes is configured to diverge from the second electrode of the at least a pair of electrodes.

16. The method of claim 12, wherein each electrode of the at least a pair of electrodes comprises a pitch angle of 12 degrees.

17. The method of claim 12, wherein the reaction region comprises a plurality of points of arc between the first electrode of the at least a pair of electrodes and the second electrode of the at least a pair of electrodes.

18. The method of claim 12, wherein the injector comprises a flow adjustment component configured to regulate the flow of the at least a fluid entering the reaction region.

19. The method of claim 12, wherein the pressure regulator is configured to pressurize the at least a fluid entering the reaction region.

20. The method of claim 12, wherein the ignition unit comprises:
   an ignition circuit configured to convert electrical power received from a power source into a high-voltage discharge of 6 kV to 30 kV.

* * * * *